3,324,105
PYRAZOLE MONOAZO DYESTUFFS
Hans-Gerhard Hanke, Leverkusen, Gerhard Wolfrum, Opladen, and Hermann Wunderlich, Cologne-Mulheim, Germany, assignors to Farbenfabriken Bayer Aktiengesellschaft, Leverkusen, Germany, a corporation of Germany
No Drawing. Filed Nov. 3, 1964, Ser. No. 408,688
Claims priority, application Germany, Nov. 15, 1963, F 41,287
11 Claims. (Cl. 260—158)

The invention relates to novel azo dyestuffs; more particularly it relates to azo dyestuffs which are insoluble or barely soluble in water and which correspond to the formula

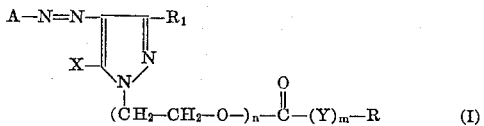

(I)

In this formula A stands for the residue of a diazo component, X stands for a hydroxyl or amino group, $n$ for the number 1 or 2, Y for the grouping —NH— or —O—, $m$ for the number 0 or 1, R for an aliphatic, araliphatic, cycloaliphatic or aromatic radical and $R_1$ for a lower alkyl radical, a radical of the benzene series, a carbalkoxy or carbalkoxyalkyl group; the dyestuffs are free of sulphonic acid and carboxylic acid groups.

The new azo dyestuffs are obtained when a diazo compound is coupled with a coupling component of the general formula

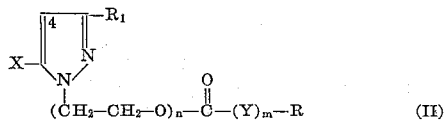

(II)

in 4-position, selecting starting components which are free from sulphonic and carboxylic acid groups.

The starting components are preferably coupled in a neutral to weakly acid aqueous, organic or aqueous-organic medium and the dyestuffs obtained, which are barely soluble to insoluble in water, are isolated in the usual way.

Among the diazo components A—NH$_2$ those of the benzene, (benz)thiazole and thiadiazole series are preferred; the diazo components may have non-ionic substituents such as cyano, halogeno, e.g. —Cl and —Br, nitro, lower alkyl sulphonyl, e.g. methyl sulphonyl and ethyl sulphonyl, lower alkyl, preferably those having 1 to 4 carbon atoms, lower alkoxy, preferably those having 1 to 3 carbon atoms, carbo lower alkoxy groups the alkyl radicals of which having 1 to 4 carbon atoms, aryl substituents such as phenyl and substituted phenyl (for instance by the above-mentioned substituents), sulphonamide and substituted sulphonamide groups, for instance alkyl or dialkyl substituted sulphonamide groups the alkyl groups of which having 1 to 5 carbon atoms.

Suitable diazo components are e.g.

2-nitroaniline,
4-nitroaniline,
2-chloro-4-nitroaniline,
4-chloro-2-nitroaniline,
2,6-dichloro-4-nitroaniline,
2,4-dinitro-6-chloro-aniline,
2-cyano-4-nitroaniline,
2,4-dinitro-6-bromoaniline,
2-bromo-4-nitro-6-cyano-aniline,
4-methylsulfonylaniline,
2-bromo-4-ethylsulfonylaniline,
2-bromo-4-ethylsulfonyl-6-nitroaniline,
2-methoxy-4-nitroaniline,
4-cyano-aniline,
3,4-dicyano-aniline,
2-cyano-4- or -5-chloroaniline,
4-chloroaniline,
2,4-dichloroaniline,
4-amino-benzoic acid methyl ester,
4-amino-benzoic acid-n-butyl ester,
4-carbethoxy-2-nitroaniline,
5-amino-3-methylthiadiazole-1,2,4,
5-amino-3-phenyl-thiadiazole-1,2,4,
5-amino-3-benzyl-mercapto-thiadiazole-1,2,4,
5-nitro-2-aminothiazole,
2-amino-6-methyl-sulfonylbenzothiazole-1,3,
4-amino-azobenzene and
2-amino-anisole.

The azo components to be used according to the invention are obtained by reaction of pyrazoles of the formula

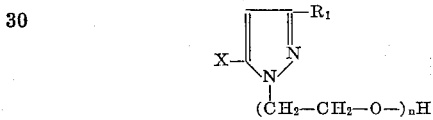

wherein X, $R_1$, and $n$ have the above-mentioned meaning, with organic acid anhydrides, acid chlorides, acid semi-ester chlorides, isocyanates or chloro-carbonic acid esters. Suitable acylating agents are for example acetic anhydride, propionic acid chloride, succinic acid semiester chloride, benzoyl chloride, 2,4-dichlorobenzoyl chloride, methyl isocyanate, ethyl isocyanate, cyclopentyl isocyanate, cyclohexyl isocyanate, phenyl isocyanate, p-chlorophenyl isocyanate and ethyl chloroformate. From this collection it is apparent that the aliphatic, araliphatic, cycloaliphatic and aromatic radicals R in the coupling components of the Formula II can be further substituted by the usual substituents with the exception of sulphonic and carboxylic acid groups. A special case of the further substitution of aliphatic radicals is given, for example, when acid semiester chlorides such as succinic acid semiester chlorides are used for the production of the components (II), leading to the grouping —(CH$_2$)$_z$—COOR$_2$ for the radical R; in this, $z$ stands for a whole number, preferably for a whole number from 1 to 4, and R$_2$ preferably for a lower alkyl radical.

For the production of the new dyestuffs the following compounds are suitable for example:

Structures (with X = —NH₂ or —OH):

- Pyrazole with 3-CH₃, N-CH₂—CH₂—O—C(=O)—CH₂—C₆H₅
- Pyrazole with 3-CH₃, N-CH₂—CH₂—O—C(=O)—C₆H₅
- Pyrazole with 3-CH₃, N-CH₂—CH₂—O—C(=O)—NH—CH₃
- Pyrazole with 3-CH₃, N-CH₂—CH₂—O—C(=O)—NH—C₆H₅
- Pyrazole with 3-COOC₂H₅, N-CH₂—CH₂—O—C(=O)—NH—C₆H₄—Cl
- Pyrazole with 3-C₆H₅, N-CH₂—CH₂—O—C(=O)—OC₂H₅
- Pyrazole with 3-CH₃, N-CH₂—CH₂—O—CH₂—CH₂—O—C(=O)—CH₃
- Pyrazole with 3-CH₃, N-CH₂—CH₂—O—C(=O)—O—C₂H₅
- Pyrazole with 3-CH₃, N-CH₂—CH₂—O—C(=O)—CH₂—CH₂—COOC₂H₅

X = —NH₂ or —OH

The new dyestuffs are outlastingly suitable for the dyeing and printing of synthetic fibres, especially of polyolefine fibres, particularly nickel-modified polypropylene, of terephthalic acid polyglycol ester fibres and synthetic superpolyamide fibres as well as cellulose ester fibres (2½-and triacetyl cellulose), or fabrics and knitted materials produced therefrom. Since the dyestuffs are insoluble or only slightly soluble in water, the dyeing is expediently carried out in the presence of dispersing compounds. For accelerating the dyeing, swelling agents can be added to the dyebath in the usual way; dyeing may also be carried out at elevated temperatures in closed apparatus.

The following examples are given for the purpose of illustrating the invention, the parts being parts by weight.

Example 1

5.4 parts of 2-chloro-4-nitroaniline are stirred with 20 parts of concentrated hydrochloric acid at room temperature for 4 hours and, after the addition of 30 parts of ice water, diazotized with 20 parts of a 10% sodium nitrite solution at 0 to 5° C. The diazonium salt solution is then poured into a solution of 5.6 parts of the pyrazolone of the formula HO—[pyrazole with 3-CH₃, N-CH₂—CH₂—O—C(=O)—CH₃]

in 100 parts of water and 85 parts of a 20% sodium carbonate solution. After 30 minutes the dyestuff is precipitated by the addition of some common salt. It has the following constitution $O_2N$—C₆H₃(Cl)—N=N—[pyrazole: 3-CH₃, 5-OH, N-CH₂—CH₂—O—C(=O)—CH₃]

The production of the azo components proceeds by molar reaction of 1-β-hydroxyethyl-3-methyl pyrazolone-(5) with acetic anhydride in acetic acid or water at 50 to 80° C.

25 parts of the yellow dyestuff obtained according to this example are ground with 75 parts of a condensation product from β-naphthalene sulphonic acid and formaldehyde and with 120 parts of water for 24 hours in a ball mill. The paste is then dried in vacuum at 50° C. and the residue finely ground.

1 part of this dyestuff powder is stirred into 1000 parts of hot water which contains 8–10 parts of a carrier, e.g. benzoic acid, and is adjusted with sulphuric acid to a pH of about 4.5. A very fine dyestuff dispersion is obtained into which 50 parts of polyester fibres are introduced at 40 to 60° C. The dyebath is heated to the boil within 20 minutes and kept at this temperature for one to one and a half hours. The dyed material is then thoroughly rinsed with water and dried. A yellow dyeing is obtained with very good fastness to wetting, sublimation and light.

The dyeings on polyesters show the same very good fastness properties if the process is carried out with a dispersion in water without carrier additive in a closed dyeing apparatus at temperatures between 105 and 130° C.

Example 2

If the azo component in Example 1 is replaced by the equivalent amount of a pyrazolone of the formula HO—[pyrazole: 3-CH₃, N-CH₂—CH₂—O—C(=O)—NH—C₆H₅]

the following dyestuff is obtained $O_2N$—C₆H₃(Cl)—N=N—[pyrazole: 3-CH₃, 5-OH, N-CH₂—CH₂—O—C(=O)—NH—C₆H₅]

which dyes polyester fibres yellow with good fastness properties.

The azo components can be produced by reacting equimolar amounts of 1-β-hydroxyethyl-3-methyl pyrazolone-(5) with phenyl isocyanate in acetonitrile at 50 to 60° C. in the presence of catalytic amounts of pyridine.

Further valuable dyestuffs are obtained if the diazo and coupling components given in the following table are combined with each other in the stated manner; the dyestuffs obtained dye aromatic polyester fibres in the given shades.

| Ex. No. | Diazo component | Azo component | Shade on Polyester |
|---|---|---|---|
| 3 | 2-nitroaniline | 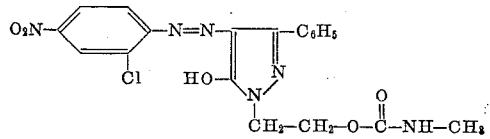 | Yellow. |
| 4 | 4-nitroaniline | Same as Ex. 3 | Do. |
| 5 | 2,6-dichloro-4-nitroaniline | do | Do. |
| 6 | 4-amino-azobenzene | do | Do. |
| 7 | 2-cyano-5-chloro-aniline | do | Do. |
| 8 | 2-cyano-4-nitroaniline | do | Do. |
| 9 | 4-carbethoxy-2-nitroaniline | do | Do. |
| 10 | 5-amino-3-phenylthiadiazole-1,2,4 | do | Do. |
| 11 | 2-amino-benzothiazole | do | Do. |
| 12 | 4-amino-benzoic acid-n-butyl ester | do | Do. |
| 13 | 2,4-dichloro-aniline | do | Do. |
| 14 | 2-nitroaniline | HO—[pyrazole ring]—CH₃ with N-CH₂CH₂OC(O)—NHC₆H₅ | Do. |
| 15 | 4-nitroaniline | Same as Ex. 14 | Do. |
| 16 | 2,6-dichloro-4-nitroaniline | do | Do. |
| 17 | 4-amino-azobenzene | do | Do. |
| 18 | 2-cyano-5-chloro-aniline | do | Do. |
| 19 | 2-cyano-4-nitroaniline | do | Do. |
| 20 | 4-carbethoxy-2-nitroaniline | do | Do. |
| 21 | 5-amino-3-phenylthiadiazole-1,2,4 | do | Do. |
| 22 | 2-amino-benzothiazole | do | Do. |
| 23 | 4-amino-benzoic acid-n-butyl ester | do | Do. |
| 24 | 2,4-dichloro-aniline | do | Do. |

*Example 25*

If the azo component used in Example 1 is replaced by the equivalent amount of a pyrazolone of the formula

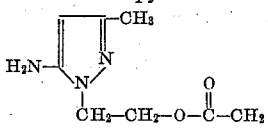

a valuable dyestuff is likewise obtained which dyes polyesters yellow with good fastness properties.

The azo component used in this case is obtained by reaction of 1-β-hydroxyethyl-3-methyl-5-amino pyrazole with acetic anhydride in acetic acid.

In an analogous manner the dyestuff of the formula

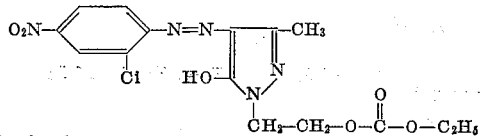

is obtained.

The azo component is produced by the reaction of 1-β-hydroxyethyl-3-methyl pyrazolone-(5) with ethyl chloroformate in acetonitrile in the presence of pyridine.

By the same process the following dyestuff is obtained $$O_2N-C_6H_3(Cl)-N=N-[\text{pyrazole}]-C_6H_5, \; HO-, \; N-CH_2-CH_2-O-C(O)-NH-CH_3$$

The azo component used in this case is obtained by reaction of 1-β-hydroxyethyl-3-phenyl-pyrazolone-(5) with methyl isocyanate in acetonitrile in the presence of diazabicyclooctane as catalyst.

Further valuable dyestuffs are obtained if the diazo and coupling components listed in the following table are combined with each other in the stated manner; the dyestuffs obtained dye aromatic polyester fibres in the given shades.

| Ex. No. | Diazo component | Azo component | Shade on Polyester |
|---|---|---|---|
| 26 | 4-nitroaniline | H₂N—[pyrazole]—CH₃ with N-CH₂—CH₂—O—C(O)—CH₃ | Yellow. |
| 27 | 2-nitroaniline | Same as Ex. 26 | Do. |
| 28 | 2,6-dichloro-4-nitroaniline | do | Greenish yellow. |
| 29 | 4-amino-azobenzene | do | Yellow. |
| 30 | 2-cyano-5-chloro-aniline | do | Greenish yellow. |
| 31 | 2-cyano-4-nitroaniline | do | Do. |
| 32 | 4-carbethoxy-2-nitroaniline | do | Yellow. |
| 33 | 5-amino-3-phenyl-thiadiazole-1,2,4 | do | Do. |
| 34 | 2-amino-benzothiazole | do | Do. |
| 35 | 4-amino-benzoic acid-n-butyl ester | do | Do. |
| 36 | 2,4-dichloro-aniline | do | Greenish yellow. |
| 37 | 2-nitroaniline | HO—[pyrazole]—CH₃ with N-CH₂—CH₂—O—C(O)—O—C₂H₅ | Do. |

| Ex. No. | Diazo component | Azo component | Shade on Polyester |
|---|---|---|---|
| 38 | 4-nitroaniline | Same as Ex. 37 | Yellow. |
| 39 | 2,6-dichloro-4-nitroaniline | do | Greenish yellow. |
| 40 | 4-aminoazobenzene | do | Reddish yellow. |
| 41 | 2-cyano-5-chloraniline | do | Greenish yellow. |
| 42 | 2-cyano-4-nitroaniline | do | Yellow. |
| 43 | 4-carbethoxy-2-nitroaniline | do | Do. |
| 44 | 5-amino-3-phenyl-thiadiazole-1,2,4 | do | Do. |
| 45 | 2-amino-benzothiazole | do | Do. |
| 46 | 4-amino-benzoic acid-n-butyl ester | do | Do. |
| 47 | 2,4-dichloroaniline | do | Greenish yellow. |
| 48 | 2-nitroaniline | 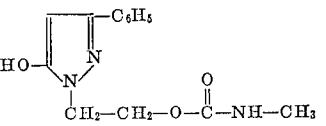 | Yellow. |
| 49 | 4-nitroaniline | Same as Ex. 48 | Do. |
| 50 | 2,6-dichloro-4-nitroaniline | do | Greenish yellow. |
| 51 | 4-amino-azobenzene | do | Reddish yellow. |
| 52 | 2-cyano-5-chloroaniline | do | Greenish yellow. |
| 53 | 2-cyano-4-nitroaniline | do | Yellow. |
| 54 | 4-carbethoxy-2-nitroaniline | do | Do. |
| 55 | 5-amino-3-phenyl-thiadiazole-1,2,4 | do | Do. |
| 56 | 2-amino-benzothiazole | do | Do. |
| 57 | 4-amino-benzoic acid-n-butyl ester | do | Do. |
| 58 | 2,4-dichloro-aniline | do | Greenish yellow. |

*Example 59*

10.8 parts of 2-amino-anisole are dissolved in 60 parts of water and 17 parts of concentrated hydrochloric acid and diazotised at 0° C. with a solution of 6.9 parts of sodium nitrite in 20 parts of water. The diazonium salt solution is then poured into a solution of 24.6 parts of the pyrazolone of the formula

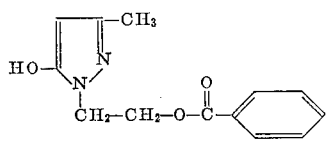

in 200 parts of water and 30 parts of sodium hydroxide. When the coupling is terminated, the precipitated dyestuff of the following constitution

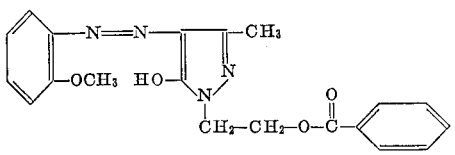

is filtered off with suction. It yields yellow dyeings with good fastness properties on metal-modified polypropylene fibres.

The azo component is produced by molar reaction of 1-β-hydroxyethyl-3-methyl pyrazolone-(5) with benzoyl chloride in pyridine or dilute alkali.

*Example 60*

5.4 parts of 2-chloro-4-nitro aniline are stirred for 4 hours at room temperature with 20 parts of concentrated hydrochloric acid and after the addition of 30 parts of ice water diazotised at 0 to 5° C. with 20 parts of a 10% sodium nitrite solution. The diazonium salt solution is subsequently added to a solution of 6 parts of the pyrazolone of the formula

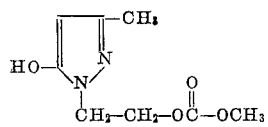

in 100 parts of water and 85 parts of a 20% sodium carbonate solution. After 30 minutes the dyestuff is precipitated by the addition of some common salt. It has the following constitution

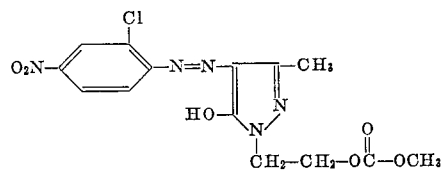

and dyes aromatic polyesters yellow shades with good general fastness properties.

The azo component is produced by a molar reaction of 1-β-hydroxyethyl-3-methyl-pyrazolone-(5) with methyl chloroformate in the presence of pyridine.

*Example 61*

If the azo component of Example 60 is replaced by the equivalent amount of a pyrazolone of the formula

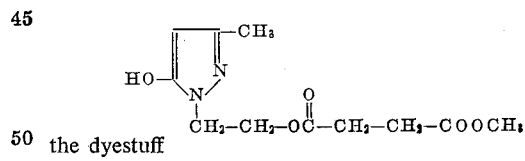

the dyestuff

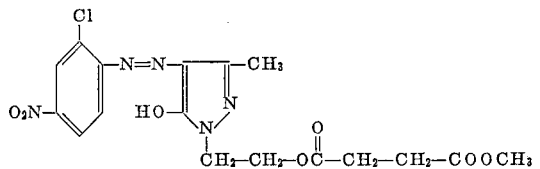

is obtained which dyes materials from polyesters yellow shades with excellent fastness properties.

The azo component is produced by reaction of 1-β-hydroxyethyl-3-methyl-pyrazolone-(5) with succinic acid semi ester chloride.

*Example 62*

According to the instructions given in Example 61 the following dyestuff is obtainable

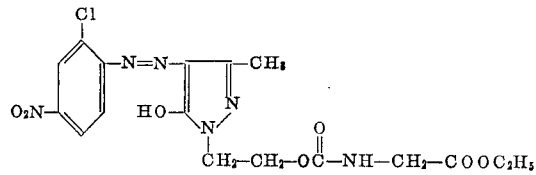

which dyes materials from polyesters yellow shades with very good fastness properties.

following table; the dyestuffs thus obtained dye fibres from aromatic polyesters in shades mentioned below.

| Ex. No. | Diazo Component | Azo Component | Shade on polyester |
|---|---|---|---|
| 63 | 2-nitroaniline | pyrazole with CH$_3$, HO, N, N–CH$_2$–CH$_2$–OC(O)–C$_6$H$_5$ | Yellow. |
| 64 | 4-chloro-2-aminobenzoic acid nitrile | Same as Ex. 63 | Do. |
| 65 | 5-nitro-2-aminobenzoic acid nitrile | do | Do. |
| 66 | 2-chloro-4-nitroaniline | do | Do. |
| 67 | 2,4-dinitroaniline | do | Reddish yellow. |
| 68 | 5-nitro-2-aminobenzoic acid nitrile | pyrazole with CH$_3$, HO, N, N–CH$_2$CH$_2$OC(O)–CH$_2$CH$_2$COOCH$_3$ | Yellow. |
| 69 | 5-amino-3-phenylthiadiazole-1,2,4 | Same as Ex. 68 | Do. |
| 70 | 4-chloro-2-aminobenzoic acid nitrile | do | Greenish yellow. |
| 71 | 2-amino-benzthiazole | do | Yellow. |
| 72 | 4-amino-benzoic acid methylester | do | Greenish yellow. |
| 73 | 4-carbethoxy-2-nitroaniline | do | Yellow. |
| 74 | 2,4-dinitroaniline | do | Reddish yellow. |
| 75 | 4-chloro-2-aminobenzoic acid nitrile | pyrazole with CH$_3$, HO, N, N–CH$_2$CH$_2$OC(O)–NH–CH$_2$(COOC$_2$H$_5$) | Greenish yellow. |
| 76 | 2-amino-benzthiazole | Same as Ex. 75 | Yellow. |
| 77 | 4-amino-benzoic acid methylester | do | Greenish yellow. |
| 78 | 4-carbethoxy-2-nitroaniline | do | Yellow. |
| 79 | 2,4-dinitroaniline | do | Do. |

The azo component used in this example is obtained by reaction of 1-β-hydroxyethyl-3-methyl-pyrazolone-(5) with isocyanate ethyl acetate.

Further valuable dyestuffs are obtained by reacting the diazo components and coupling components listed in the following table is a list of diazo components and coupling components used for the production of dyestuffs of the invention which dye nickel modified polypyropylene said shades with good general fastness properties.

| Ex. No. | Diazo Component | Coupling Component | Shade on nickel polypropylene |
|---|---|---|---|
| 80 | 2-amino-anisole | pyrazole with CH$_3$, HO, N, N–CH$_2$CH$_2$–OC(O)–CH$_3$ | Reddish yellow. |
| 81 | 5-amino-3-phenylthiadiazole-1,2,4 | Same as Ex. 80 | Yellowish orange. |
| 82 | 2-amino-benzthiazole | do | Do. |
| 83 | 2-aminoanisole | pyrazole with CH$_3$, HO, N, N–CH$_2$CH$_2$–OC(O)–NH–C$_6$H$_5$ | Yellow. |
| 84 | 5-amino-3-phenylthiadiazole-1,2,4 | Same as Ex. 83 | Do. |
| 85 | 2-aminobenzthiazole | do | Do. |
| 86 | 2-aminoanisole | pyrazole with CH$_3$, HO, N, N–CH$_2$CH$_2$–OC(O)OCH$_3$ | Greenish yellow. |
| 87 | 2-aminobenzthiazole | Same as Ex. 86 | Golden yellow. |
| 88 | 2-aminoanisole | pyrazole with CH$_3$, HO, N, N–CH$_2$CH$_2$–OCNH–CH$_2$(COOC$_2$H$_5$) | Greenish yellow. |

| Ex. No. | Diazo Component | Coupling Component | Shade on nickel polypropylene |
|---|---|---|---|
| 89 | 2-aminobenzthiazole | Same as Ex. 88 | Reddish yellow. |
| 90 | 2-aminoanisole | 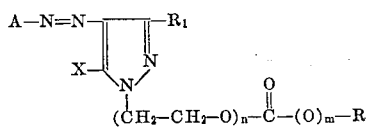 | Yellow. |
| 91 | do | 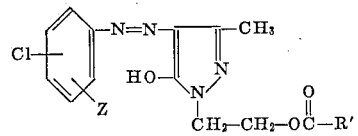 | Greenish yellow. |
| 92 | 5-amino-3-phenylthiadiazole-1,2,4 | Same as Ex. 91 | Reddish yellow. |

We claim:

1. Azo dyestuffs being free of sulfonic acid and carboxylic acid groups and of the formula:

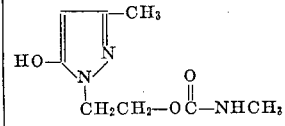

wherein A stands for a radical selected from the group consisting of nitrothiazolyl; phenylazophenyl; benzothiazolyl; methylsulfonylbenzothiazolyl; thiadiazolyl substituted with a member from the group consisting of methyl, phenyl, nitro, and benzylmercapto; and phenyl substituted with 1-3 members from the group consisting of nitro, chloro, bromo, cyano, methylsulfonyl, ethylsulfonyl, methoxy, and carboalkoxy where the alkoxy has 1-4 carbon atoms; X stands for a member selected from the class consisting of —OH and —NH$_2$; R$_1$ stands for a member selected from the class consisting of methyl, phenyl and carboethoxy; $n$ stands for an integer ranging from 1-2; $m$ stands for an integer ranging from 0-1; and R stands for a member selected from the class consisting of methyl, ethyl, cyclopentyl, cyclohexyl, phenyl, benzyl, chlorophenyl, dichlorophenyl, and alkylene carboalkoxy where the alkylene and the alkoxy portions each contain 1-2 carbon atoms.

2. A dyestuff of claim 1 wherein A is o-methoxyphenyl.

3. A dyestuff of claim 1 wherein —(O)$_m$—R is a member selected from the class consisting of methyl, methoxy and phenyl.

4. An azo dyestuff of the formula

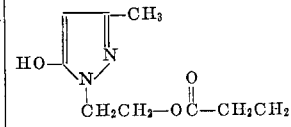

wherein R' is a member selected from the class consisting of methyl, ethyl, cyclopentyl, cyclohexyl, phenyl, benzyl, chlorophenyl, dichlorophenyl, and alkylene carboalkoxy where the alkylene and the alkoxy portions each contain 1-2 carbon atoms and Z is a member selected from the class consisting of nitro and cyano.

5. An azo dyestuff of the formula

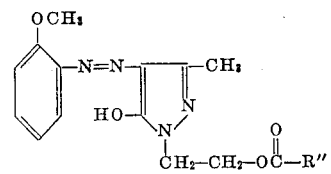

wherein R" is a member selected from the class consisting of methyl, ethyl, cyclopentyl, cyclohexyl, phenyl, benzyl, chlorophenyl, dichlorophenyl, and alkylene carboalkoxy where the alkylene and the alkoxy portions each contain 1-2 carbon atoms.

6. The dyestuff of the formula

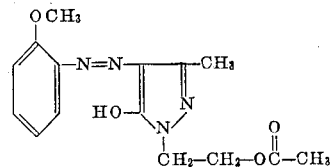

7. The dyestuff of the formula

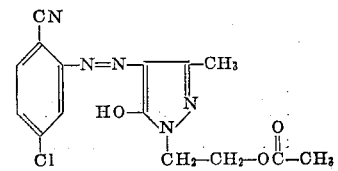

8. The dyestuff of the formula

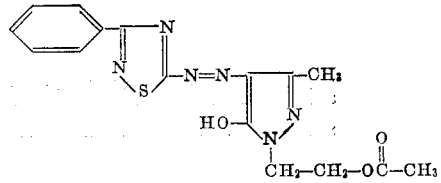

9. The dyestuff of the formula

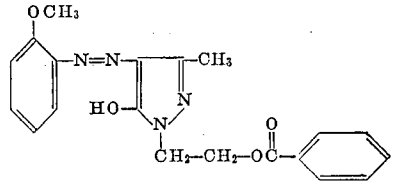

10. The dyestuff of the formula
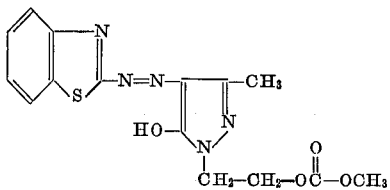
11. The dyestuff of the formula
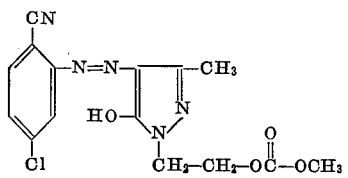
References Cited
UNITED STATES PATENTS
2,634,262  4/1953  Piepenbrink et al. ____ 260—163
FOREIGN PATENTS
224,238  11/1962  Austria.
1,085,277  7/1960  Germany.
CHARLES B. PARKER, *Primary Examiner.*
FLOYD D. HIGEL, *Assistant Examiner.*

UNITED STATES PATENT OFFICE
CERTIFICATE OF CORRECTION

Patent No. 3,324,105

June 6, 1967

Hans-Gerhard Hanke et al.

It is hereby certified that error appears in the above numbered patent requiring correction and that the said Letters Patent should read as corrected below.

Column 3, lines 6 to 10, for that portion of the formula reading $-C_6H_3$ read $-C_6H_5$ lines 24 to 30, for that portion of the formula reading

    read    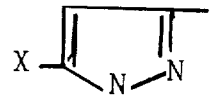

same column 3, line 56, for "outlastingly" read -- outstandingly --; column 4, line 69, for "acentonitrile" read -- acetonitrile --; column 5, line 39, for "$-CH_2$" at the end of the formula read -- $-CH_3$ --.

Signed and sealed this 25th day of June 1968.

(SEAL)
Attest:

EDWARD M. FLETCHER, JR.
Attesting Officer

EDWARD J. BRENNER
Commissioner of Patents